United States Patent [19]

Antioco

[11] 4,021,938
[45] May 10, 1977

[54] ANSWER SCORING DEVICE

[76] Inventor: Frank R. Antioco, 88-34 50th Ave., Elmhurst, N.Y. 11373

[22] Filed: Jan. 16, 1976

[21] Appl. No.: 649,752

[52] U.S. Cl. .............................................. 35/48 R
[51] Int. Cl.² .......................................... G09B 3/00
[58] Field of Search .......................... 35/48 R, 48 A

[56] References Cited
UNITED STATES PATENTS

| | | | |
|---|---|---|---|
| 1,842,470 | 1/1932 | Brownlee | 35/48 A |
| 1,915,653 | 6/1933 | Dutton | 35/48 A |
| 3,188,754 | 6/1965 | Loving | 35/48 R |
| 3,224,116 | 12/1965 | De Pue | 35/48 A |
| 3,827,165 | 8/1974 | Jacobson | 35/48 A |

Primary Examiner—William H. Grieb
Attorney, Agent, or Firm—Allison C. Collard

[57] ABSTRACT

This invention consists of a template for use with a readable answer sheet. The answer sheet records the answers to multiple-choice, true-false or matching questions and includes answer blocks containing four columns, although at times, only two columns may be utilized by the testee as in the case of answering true-false questions. The template includes a base portion provided with openings and means to receive an answer plate or card on each of the openings so that the answer sheet may be checked and marked without resort to a machine to read the answers. The openings are provided with means to maintain the answer plate or card in registry with the answer blocks on the answer sheet so as to permit the visual inspection of the answers through apertures provided in the answer card.

10 Claims, 9 Drawing Figures

Fig. 1.

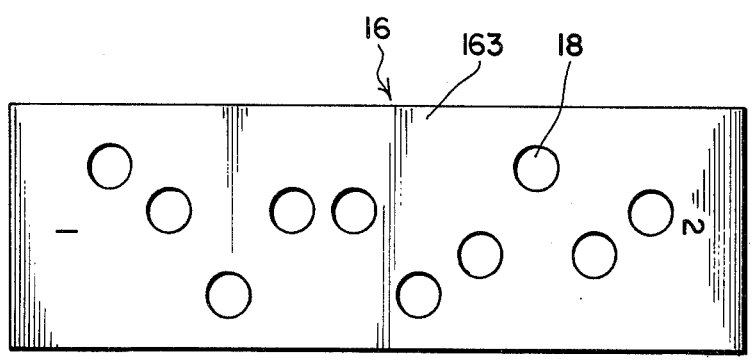
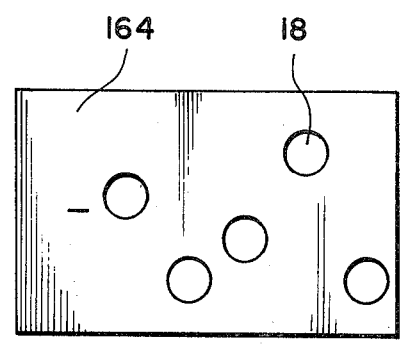
Fig. 3.   Fig. 4.
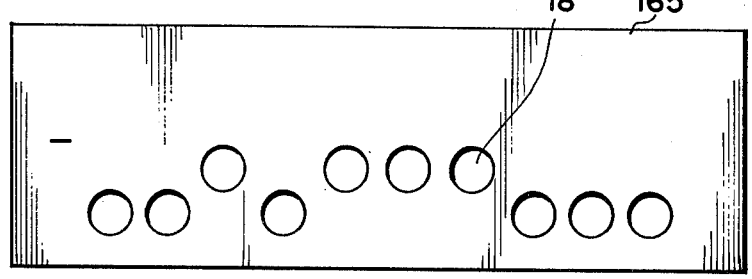
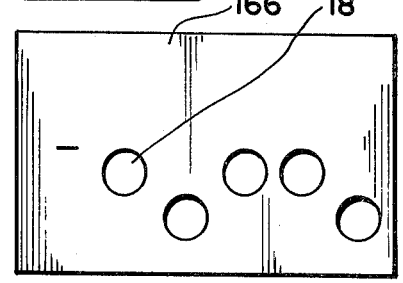
Fig. 5.   Fig. 6.
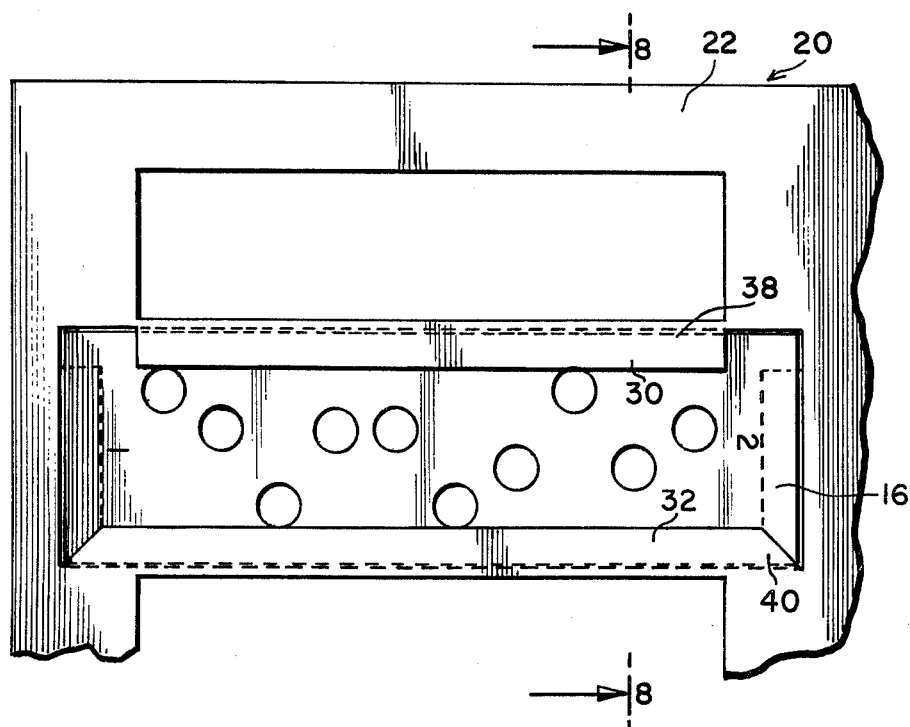
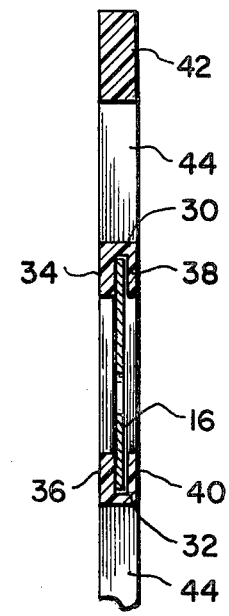
Fig. 7.   Fig. 8.

ANSWER SCORING DEVICE

This invention relates to a teacher's testing and marking kit, and more particularly to a template adapted to have answer plates or cards inserted therein to provide for interchangeable answers to test questions.

Examinations are often given in the school system in which a student or testee is asked to provide answers on a multiple choice basis or a true-false basis. When the student is asked to provide answers on a multiple choice basis, he is usually given a sheet containing two or more columns, and in particular four columns and is asked to pick out one of four answers suggested on the test paper and mark his answer by filling in a small space corresponding to one of the four answers. When the student is asked to provide true-false answers, the same type of sheet may be used, but the sheet should preferably be provided with only two columns and the student is asked to fill in one column for a true answer or a second column for a false answer. These tests are conventionally marked by means of a machine which detects the pencil marking, and activates a scoring counter.

When a machine is used to mark the answer sheet, the student must be given electrographic pencils so that the machine will be sensitive to answers marked. Moreover, the marking task may take a long time because there may not be easy accessibility to the machine for machine marking.

It is proposed to overcome some of the aforesaid difficulties while at the same time permit a teacher to use a modified form of the standard type answer sheets and mark the answer sheets himself or give this to another to mark the correct answers without having to resort to an expensive marking machine which may not be readily available. Moreover, the teachers may also desire to have the ability to intersperse different types of questions which require both true-false answers as well as a multiple-choice answer.

It is therefore an object of the present invention to provide for a device which a teacher can use in order to enable the teacher to mark both quickly and accurately an examination paper and its questions directly without having to resort to a machine marking apparatus.

It is a further object of the present invention to provide for a kit which includes a template adapted to contain or receive coded answers for use with a standard sheet having provision thereon for receiving answers in a predetermined order and which is simple in construction and inexpensive to manufacture.

Another object of the present invention is to provide for a series of standardized answer plates or cards as well as half-plates or cards which can be used in different orders and sequences resulting in virtually millions of answer patterns thereby preventing the student or testee from ascertaining any particular code of answers.

The present invention includes a kit which provides for a template having a plurality of openings which are adapted to be in registry with the answers contained in the answer sheet designed to fit this template. The template is provided with means for receiving and holding the answer plate or card so that when the template is placed into registry with the answer sheet, visual inspection of the answer plate or card indicates which answers are correct and which are incorrect. For this purpose, the answer plate or card is provided with apertures adapted to coincide with the correct answers on the answer sheet. The template is also formed such that it has an opaque portion which covers up the information on the answer sheet which is not shown to the individual marking the paper, such as the student's or testee's name, and contains a clear portion which renders the questions and the question numbering readily visible. The plates or cards whether they be full plates or cards or half-plates or cards are held within the openings in the template and are supported by the receiving means, and these plates can be readily removed for interchangeability to provide for millions of different combinations of the order of the answers.

Other objects and features of the present invention will become apparent from reference to the drawings which disclose a preferred embodiment of the test marking kit in accordance with the present invention, of which:

FIG. 1 is a typical test answer sheet shown in schematic planar form with answers already applied thereto by a student;

FIG. 3 is an example of one answer plate or card for use with the template of FIG. 2 and adapted to contain apertures for indicating the answers to multiple-choice questions;

FIG. 4 is an answer plate or card similar to that shown in FIG. 3, but of half size;

FIG. 5 is an answer plate or card similar to that shown in FIG. 3 but adapted to contain answers to true-false questions;

FIG. 6 is a half answer plate or card of the type shown in FIG. 5;

FIG. 7 is an enlarged planar view of a detail of the template showing one of the answer plates or cards in place;

FIG. 8 is a section taken on line 8—8 of FIG. 7; and

Figure 1:
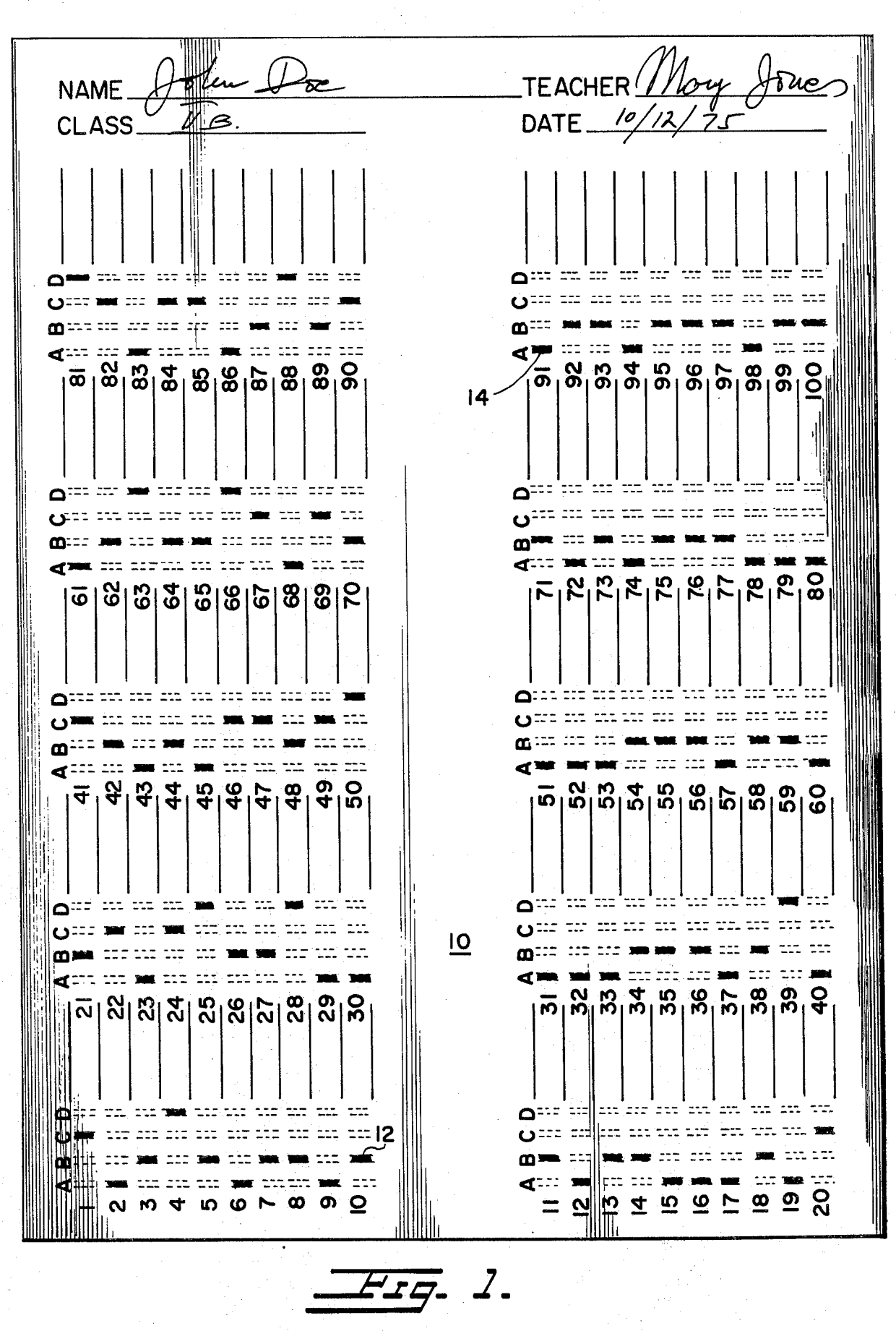
Figure 2:
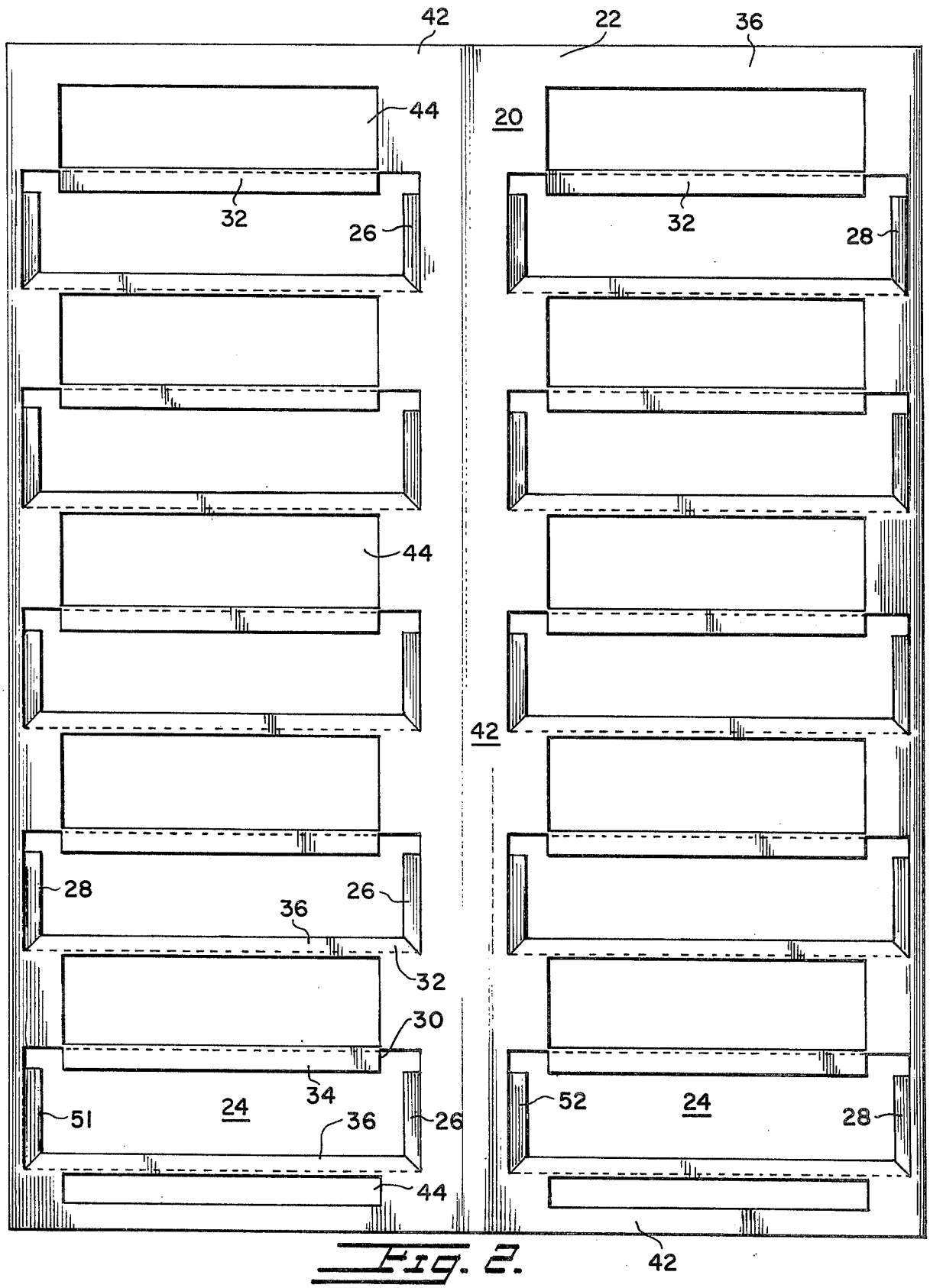
FIG. 2 is a template adapted to support and receive the plates or cards with correct answer indicia thereon to test questions and is further adapted to be placed onto the test answer sheet of FIG. 1 and maintain the plates with the correct answer indicia thereon in registry with the marked answer sheet.

Referring to the drawings which illustrate the various features of the invention, modified conventional answer sheet 10 is shown in FIG. 1 containing a plurality of answer blocks. Each answer block contains column designated A, B, C and D in which a student may mark his answer by marking the appropriate marking 12 within one of the aforesaid columns as shown in a first answer block, 14 as shown in the tenth answer block. The block in which the marking 12 is used is one intended for a multiple-choice reply to the questions and the marking 14 is used for a true-false question. Sheet 10 when completed is generally adapted for machine marking (when the appropriate marking instrument is used).

A typical answer plate or card generally designated 16 is provided with apertures 18 to indicate correct answers, and is shown in FIG. 3.

Figure 9:
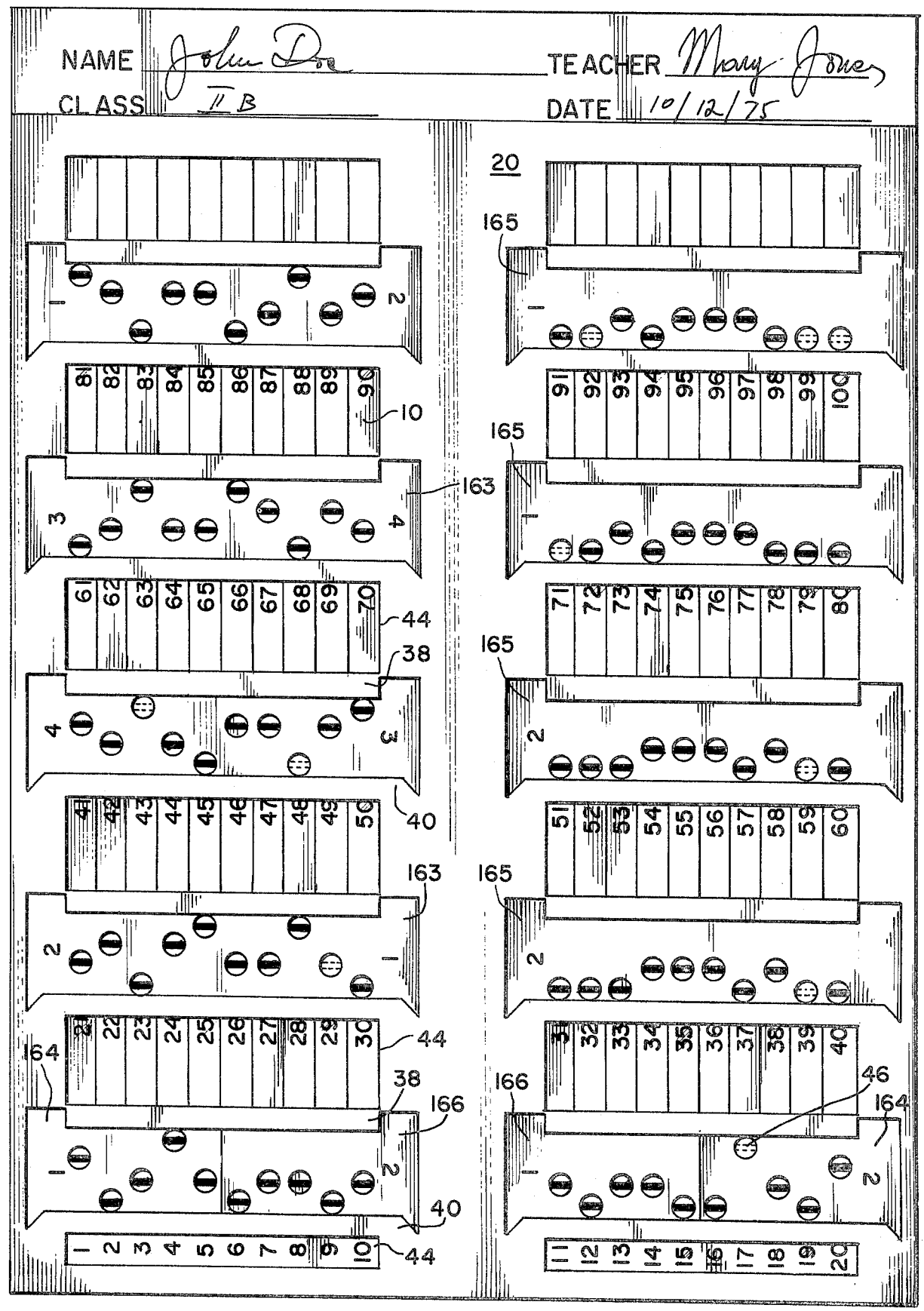
FIG. 9 is a planar view of the kit showing the answer sheet of FIG. 1 with the template of FIG. 2 placed thereon and containing the answer plates or cards of FIGS. 3, 4, 5 and 6.

Referring more particularly to FIG. 2, a template 20 includes a base portion 22 provided with rectangular openings adapted to be in registry with the blocks on answer sheet 10, and is placed as indicated in FIG. 9.

The template generally includes a pair of bottom ledges 26 and 28 along a short dimension of the openings 24.

A pair of U-shaped elements 30 and 32 (in FIG. 8) are carried by the template within the opening 24 along the long dimension thereof.

Each rectangular opening 24 is adapted to receive an answer plate or card 16 and is supported within opening 24 by means of the bottom ledges 26 and 28, and top ledges 51 and 52 and the bottom legs 34, 36 in FIG. 8 of U-shaped elements or tracks 30 and 32. In addition, U-shaped elements 30 and 32 also include a top leg portion 38 and 40 to complete the job of holding the answer plates or card in the appropriate registry and to prevent dislodgement of the same. The template includes an opaque portion 42 and clear portions 44 so that the answer apertures 18 can be seen in relation to the question numbers, as best noted from FIG. 9.

The pair of bottom ledges 26 and 28, together with legs 30 and 32 and top ledges 51 and 52 support the answer plate or card in alignment and appropriate registry with the answer sheet 10. Card or plate 16 may be readily inserted into the template by slightly bending it so that it can be placed onto the bottom ledges 26 and 28 by aligning with and placing into opening 24 by means of the alignment legs 30 and 32. The plate or card can be removed by pushing it through opening 24 either from the top or from the bottom. In this respect, as best seen in FIGS. 7 and 8 of the drawing, a partial view of the template is shown carrying one of plates or cards 16 in place, and it will be noted that the plate or card when positioned in its appropriate place fits flush with the two bottom ledges 26 and 28 as well as bottom legs 30, 32 and top ledges 51 and 52 and is held in place by the alignment legs 38 and 40.

After all the answer plates or cards are inserted into templates 20, it is placed onto the student answer sheet 10 and the view as indicated in FIG. 9 of the accompanying drawings appears.

Referring to FIGS. 3 to 6, which show the different types of answer plates or cards 16 which may be used, answer plate 163 in FIG. 3 can be used for multiple-choice questions. Answer plate or card 16 is provided with various apertures or openings 18 which are adapted to fit over the marked answers in answer sheet 10 of FIG. 1, so that it will have the appearance as shown in FIG. 9. Apertures 18 on plate or card 16 are randomly spaced, and the plate or card is provided with markings 1 and 2 on the obverse side, as well as 3 and 4 on the reverse side thereof as best seen in FIG. 9 of the drawings. With these markings, it is possible for one multiple-choice plate or card to contain four different sets of answers depending upon which number is at the top of the plate or card so that the possibility of a student observing a definite pattern between one test and another test can be virtually avoided.

FIG. 4 shows a plate or card 164 of the type used in FIG. 3. Card or plate 164 is a half card or plate which is adapted for use with another half card or plate, such as the type shown in FIG. 6 or with one of its own half plates or card to provide for further variations in the answers. Plate or card 164 may also be reversed to provide for use on its other side as shown in FIG. 9, (bottom half of answer block 2).

Referring to FIGS. 5 and 6, plate or card 165 and 166 contain answers for questions of the true-false type. The apertures 18 of cards or plates 165 and 166 will align with and coincide with columns A and B on the answer sheet 10. Plate or card 166 is a half-type card or plate similar to the half-type card or plate of FIG. 4, and both cards or plates 165 and 166 may be used in different positions. For example, card or plate 165 may be used with the number 1 or 2 at the top, and half card or plate 166 may be used/either with the number 1 or 2 at the top. The numbers 1 and 2 of these cards or plates are on opposite sides because they can only be used two ways, not four ways as in the multichoice cards or plates. When half or plates cards 164 and 166 are used, they suitably rest either on the bottom ledges 26, 28, or top ledges 51 and 52, and bottom legs 30, 32 and they are held in alignment by means of the alignment legs 38,40.

FIG. 9 shows template 20 which is preferably about one-quarter inch in thickness so as to provide for the proper rigidity and at the same time to provide for decreased bulk. Template 20 is in registry on top of an answer sheet 10 with answer plates cards 16 in place in openings 24. It will be noted that half plate or card 164 is used in answer block 1 with the number 1 at the top, and half plate card 166 is used at the bottom. This shows the joint use of a multiple choice half plate or card 164 with a true-false half plate or card 166 with the answers showing through apertures 18. Since portions 44 of template 20 have been made open, the numbers of the questions can be seen through the template, and the person checking the answers can ascertain the appropriate alignment of the cards with the answers on the answer sheet 10 and mark either X (incorrect) or ✔ (correct) accordingly in the space provided for this purpose at the right of the answer block.

Reference should now be made to answer block 2 (answers to questions 11 to 20) in which half plate or card 166 of FIG. 6 is used.

The number 1 is on the top and half plate or card 164 is used with the number 2 at the bottom so that another use of the plates or cards 164 and 166 is shown. It will also be noted from answer plate or card 164 in column 4, which is designated 46, that there is one incorrect answer aligned with the question 17 since no black marking appears through aperture 18 on card 164. In a similar manner block 3 has card 163 therein but with number 2 at the top. An incorrect answer is shown at position 29.

Reference is now made to answer block 4 (questions 31-40) which shows true-false plate or card 165. The plate or card is used on the reverse side thereof with the number 2 at the top. There is also one incorrect answer which shows through as an answer to question 39 as a result of the omission of the black marking under column A. Answer block 5 (questions 41-50) shows the use of plate or card 163 with the number 4 at the top and 3 at the bottom together with two incorrect answers for questions 43 and 48. Answer block 6 (questions 51-60) shows the use of true-false plate or card 165 with number 2 at the top and all but one of the answers indicated as correct; answer 59 is indicated as incorrect.

Answer block 7 shows plate or card 163 with number 3 on the top and the number 4 on the bottom showing an alternative position for the use of plate or card 163 with all answers correct. Answer block 8 which shows a true-false plate or card 165 with the number 1 on the top shows one error in the position for the answer to question 71. Answer block 9 shows plate or card 163 used with the number 1 on the top and number 2 on the bottom and showing all correct answers. Answer block 10 shows true-false plate or card 165 in use with errors in the answers to questions 92, 99 and 100 as a result of the absence of black marking. Aside from the cards or plates shown in FIG. 9, other cards or plates will be provided with different aperture arrangements.

It will be readily apparent that with the present invention, it is possible for a teacher or a teaching assistant to mark a test with ease without requiring the complex answer machines required with these types of tests.

It will be noted that it is possible with the use of the various cards or plates 16 to provide a multiplicity of different answer patterns so that no student can readily ascertain the answers to the questions by any order of memory of the position of the various answers. The cards or plates can be constructed of any rigid material such as cardboard, metal, plastic etc. The template is preferably constructed of a plastic sheet approximately one quarter inch thick.

It will be obvious to those of ordinary skill in the art that many changes and modifications may be made thereunto without departing from the spirit and scope of the invention.

What is claimed is:

1. An answer scoring device for use with a readable answer sheet, that is made to fit the device, the answer sheet having a plurality of answer blocks wherein each block has answer columns, comprising:
   a template having a plurality of openings therethrough each adapted for registry with one of said answer blocks on the answer sheet; and
   means in each of said openings for receiving an answer card and hold the each of the answer cards in alignment with one of said answer blocks on the answer sheet, so as to permit visual indication of the answers on the answer sheet.

2. The device according to claim 1, wherein said openings in said template are rectangular, and said means includes a pair of bottom ledges and top ledges along the short dimension of said rectangular openings.

3. The device according to claim 1, wherein said openings in said template are rectangular, and said means includes a pair of U-shaped elements along the long dimension of said rectangular openings forming a pair of tracks.

4. The device according to claim 1, wherein said means is adapted to support an answer card having apertures indicating correct answers for placement over the answer blocks, the apertures being aligned with the answer columns to indicate correct and incorrect answers in the answer columns said plurality openings opeings in said template being retangularly-shaped with two long and two short dimensions said means including a pair of bottom ledges and top ledges affixed to said short dimension of said rectangular opening, and a U-shaped element affixed to each of said long dimension of said rectangular opening operative with said bottom and top ledges for holding the answer cards in registry with and in alignment with the answer blocks.

5. The device according to claim 4, in which said U-shaped element includes a bottom leg for supporting the answer cards and a top leg for holding the answer card in alignment with said rectangular opening.

6. Card means for use in connection with the device as claimed in claim 4, wherein said cards include a plurality of apertures therethrough adapted for registry with the correct answers on the answer sheet.

7. Card means as claimed in claim 6, wherein said cards include designation markings at top and bottom to provide for different uses for said cards whereby to provide for different locations for answers to the questions.

8. Card means as claimed in claim 6 wherein said cards are half-cards such that they can be combined with other half-cards.

9. Card means as claimed in claim 6 wherein the apertures appear in two columns for use as true-false cards.

10. Card means as claimed in claim 6 wherein said apertures appear in four columns for use of the cards as multiple choice cards.

* * * * *